United States Patent [19]

Huchital et al.

[11] 3,909,736

[45] Sept. 30, 1975

[54] RF EXCITED ELECTRODELESS GAS ARC LAMP FOR PUMPING LASERS

[75] Inventors: David A. Huchital, Trumbull; George N. Steinberg, Westport, both of Conn.

[73] Assignee: Perkin-Elmer Corporation, Norwalk, Conn.

[22] Filed: Feb. 14, 1974

[21] Appl. No.: 442,976

Related U.S. Application Data

[63] Continuation of Ser. No. 238,563, March 27, 1972, abandoned.

[52] U.S. Cl. .............................. 330/4.3; 331/94.5 P
[51] Int. Cl. ............................................. H01s 3/09
[58] Field of Search .............. 331/94.5 D, 94.5 P, 6; 330/4.3; 315/330, 248, 241, 284; 313/197

[56] References Cited
UNITED STATES PATENTS

| | | | |
|---|---|---|---|
| 3,230,422 | 1/1966 | Gourber et al. | 315/248 |
| 3,353,115 | 11/1967 | Maiman | 331/94.5 D |
| 3,600,702 | 8/1971 | De Benedictis | 331/94.5 D |

OTHER PUBLICATIONS

Barnes, "Physical Characteristics of Xenon Flash-tubes," 7/64, pp. 569–573, Journal of the SMPTE, Vol. 73, No. 7.

Primary Examiner—Maynard R. Wilbur
Assistant Examiner—N. Moskowitz
Attorney, Agent, or Firm—John K. Conant

[57] ABSTRACT

An electrodeless RF excited gas arc lamp for producing sufficient light to pump a laser consists of a transparent envelope containing an inert gas, namely krypton, xenon or argon, with a coil around or adjacent the envelope and a source of RF voltage to apply sufficient voltage to the coil to maintain a plasma in the gas. For pumping a laser rod the lamp is mounted adjacent to the laser rod and is preferably cooled, as by mounting the lamp envelope and laser rod in a cooled chamber. A reflector is arranged to direct back toward the rod that light from the lamp which is not initially absorbed in the rod, and a filter may be mounted to filter out at least a portion of any unwanted components of light from the lamp (e.g., the ultraviolet component) before it impinges on the laser rod. In a preferred form, the lamp envelope is an annular chamber with a laser rod mounted through the annulus.

16 Claims, 8 Drawing Figures

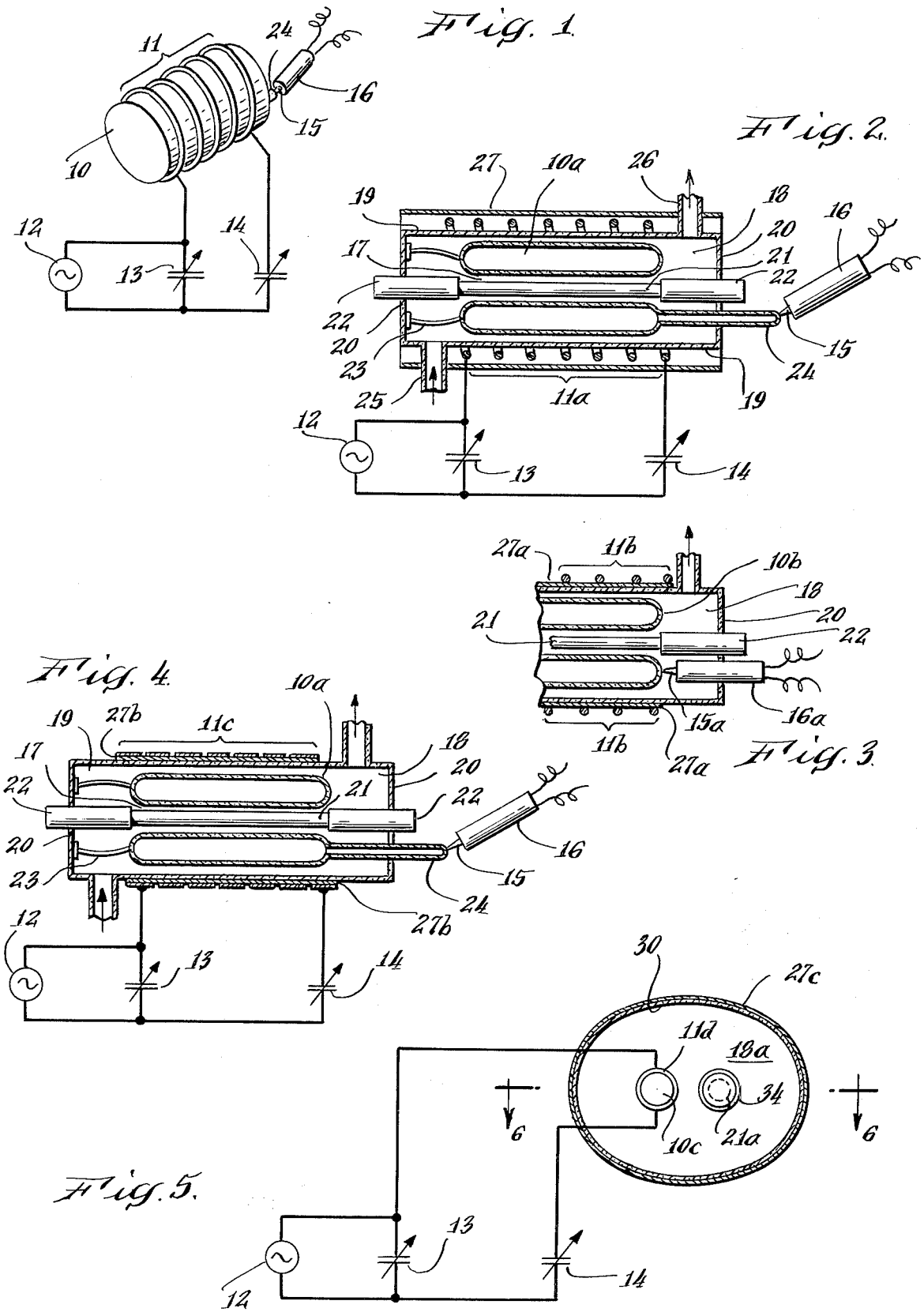

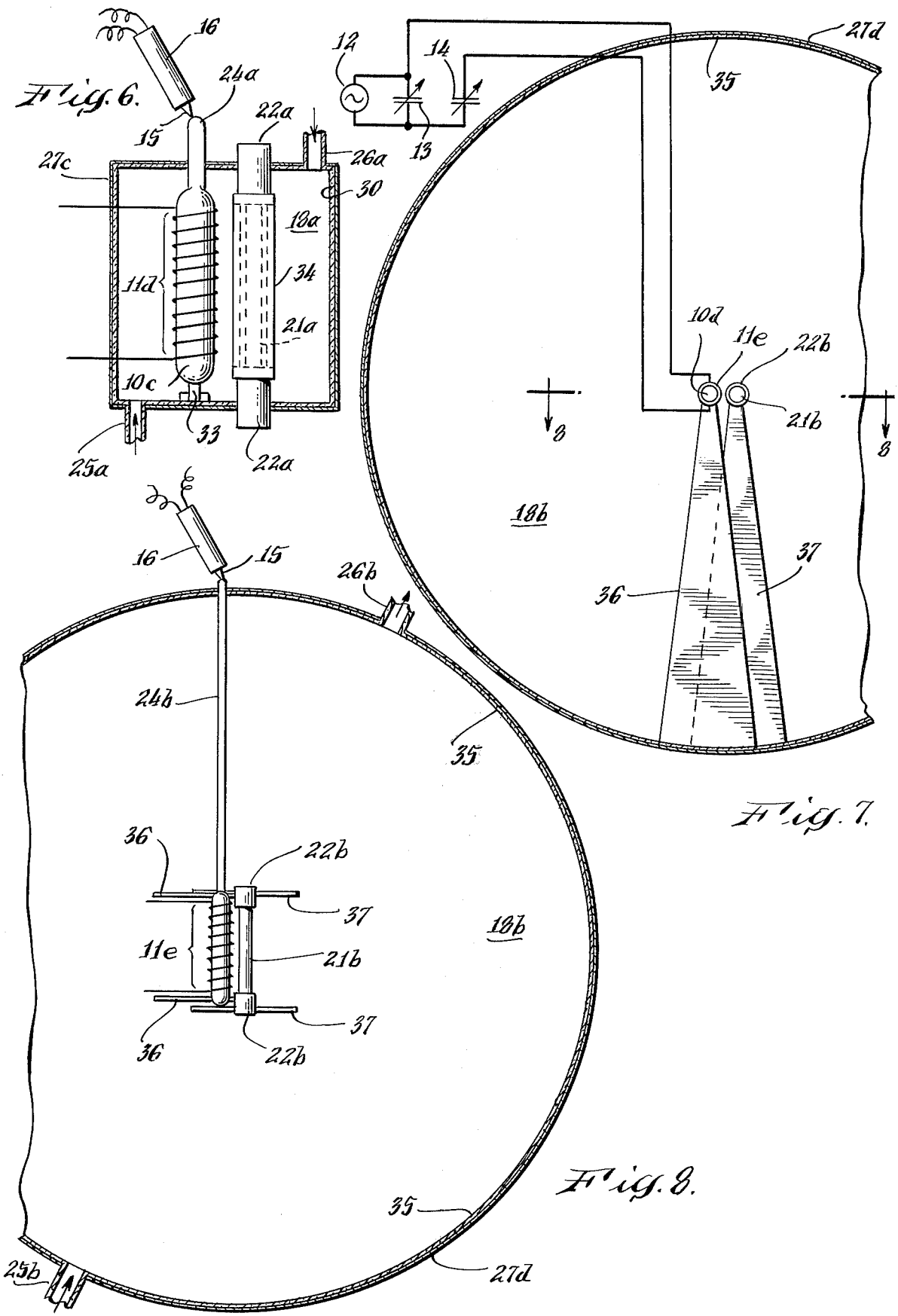

RF EXCITED ELECTRODELESS GAS ARC LAMP FOR PUMPING LASERS

This is a continuation of application Ser. No. 238,563, filed Mar. 27, 1972, and now abandoned.

BACKGROUND OF THE INVENTION

The present invention relates to arc lamps and is an RF excited gas arc lamp, particularly a krypton arc lamp, capable of producing sufficiently intense light (watts per cm$^2$) to pump a laser. The invention is described herein with particular reference to a krypton lamp for pumping an Nd:YAG (neodymium:yttrium-aluminum-garnet) laser, or lasers related thereto such as Nd:YalO$_3$ laser, which are high power lasers of growing importance and many potential uses. However, the lamp structure and geometry described is also adapted for producing high intensity light output using other inert gases, such as xenon and argon, or mixtures thereof, for pumping lasers whose absorption wavelengths correspond to wavelengths of light emitted by the particular inert gas or combination of gases contained in the lamp envelope.

Krypton arc lamps, which emit copious light in the near infrared portion of the spectrum, are the usual means for pumping Nd:YAG lasers, but previously known krypton arc lamps for this purpose are conventional DC excited high pressure gas arc lamps which utilize electrodes sealed through the end walls of the krytpon-containing quartz envelopes of the lamps. These lamps, however, have a high rate of failure and best service life that can be expected of such lamps when operated in a reflecting cavity for pumping a laser is ordinarily only about thirty to fifty hours even at modest power levels, which is generally insufficient for many important commercial and military applications.

In conventional DC excited krypton arc lamps the lamp is started by initially applying a high voltage across the electrodes to ionize the gas, and then applying a high voltage spark (e.g., 10 KV) to start the arc, after which the arc is maintained by low voltage, high current power (e.g., 100 volts and 20 amperes). This requires a rather complex switching system between the lamp and the power supply for changing and properly adjusting the different voltage and current levels necessary for starting and then operating the lamp. Due to the preciseness of the switching required for starting and operating these lamps and the complexity of the circuitry involved, a disproportionately high number of these lamps are difficult to start and from a practical standpoint, are useless. Particular drawbacks of conventional DC excited krypton arc lamps are the seals of the electrodes, and particularly the cathodes through the envelope walls; it is quite common for the lamps to explode at start-up due to rupture of the seal around the cathode stem under the strain imposed on it by the high current passing through the lamp at the moment the arc starts. But even if the lamps start and operate properly, their service life is quite short; during operation the intense ionic bombardment and radiation at the cathode, necessary to maintain its thermionic temperature, cause substantial sputtering and evaporation of the cathode so that cathode material becomes deposited on the interior of the quartz envelope. This deposit darkens the envelope which reduces the lamp output and increases the thermal loading. Further, the lamp becomes difficult to start, because of the multiple current paths provided by the deposited material which can effectively short circuit the gas at start-up.

As indicated above, krypton arc lamps are at present the most suitable means for pumping high power Nd:YAG (e.g., multi-watt single mode output) lasers, but the above described drawbacks of conventional krypton arc lamps which have been the only ones available for this purpose, have heretofore severely restricted the investigation and development of the many interesting and potentially important uses of Nd:YAG lasers.

A principal object of the present invention is to provide an RF excited inert gas arc lamp which does not have electrodes so that the aforementioned problems of seals, start-up and deposition of cathode material on the inside surfaces of the envelope are eliminated. Thus krypton arc lamps in accordance with this invention are safer and easier to operate, are more uniformly reliable, have a much longer effective service life, and are more economical to manufacture and operate than conventional krypton arc lamps.

Another object is to provide RF excited inert gas arc lamps, having the foregoing advantages, which produce sufficient light for pumping lasers, and in particular to provide reliable and uniformly efficient krypton arc lamps for pumping Nd:YAG lasers.

A further object is to provide RF excited gas arc lamp structures specifically adapted for pumping laser rods mounted in combination therewith.

BRIEF DESCRIPTION OF THE INVENTION

Arc lamps in accordance with this invention, consist essentially of an envelope, suitably of quartz, containing an inert gas, such as krypton, xenon and argon, which is excited by RF voltage applied through a coil around or adjacent to the envelope.

RF excited inert gas arc lamps are well known, but as previously designed and constructed they are not capable of producing sufficient light (watts per cm$^2$) to be useful for efficiently pumping lasers; the lamp must be capable of providing light of the required intensity in a very small area, and the lamp must be a relatively small size, comparable to the small size of laser rods, otherwise their efficiency for the purpose becomes so poor as to make them commercially impractical. Moreover, it would be logical to assume that the impedance of high pressure inert gas plasmas are so high that it would be impractical to apply the voltage required to excite a small volume of inert gas, particularly krypton, to the extent necessary to produce light of sufficient intensity to pump a laser. Also, there is a difference of more than five orders of magnitude between the impedances of a volume of krypton, for example, before and after a plasma has been generated therein so that it would appear to be a very difficult problem to provide power supply circuitry in which the impedance would substantially match the impedance of the "cold" gas in the lamp for start up and be adjusted to match the vastly different impedance of the lamp when a plasma is ignited therein, and be able to make the new impedance match quickly enough so that plasma would not extinguish due to insufficient current to maintain it, or would be maintained in an unstable manner.

However, in accordance with the present invention, it has been discovered that with an appropriate combination of pressure of the gas, geometry of the envelope and power supply circuitry, RF voltage (defined herein as voltage having a frequency in the range of from 0.1 to 100 megacycles per second) can effectively be coupled into the gas for maintaining a plasma that provides a sufficiently intense and stable light output to pump a laser.

In general the critical factors which must be in proper relation to provide an RF excited inert gas arc lamp that will provide the required high intensity light for pumping lasers are the geometry of the envelope, the impedance of the plasma, and the pressure of the gas.

The geometry of an arc lamp envelope is generally expressed in terms of characteristic length, $\Lambda$, which is a function of the length and of the lateral dimensions of the envelope and which refers to the average length or distance ions and electrons of the gas atoms travel from the points of excitation to points of impact with a wall of the envelope. In the context of the present invention, it is generally desired to have the characteristic length of the envelope and hence its surface area as small as possible in order to maximize the intensity of light output per unit area of the envelope.

The impedance, Z, of the gas plasma is approximately proportional to the $m$th power of the pressure P divided by the characteristic length $\Lambda$, $Z \propto P^M/\Lambda$, where $m$ is a factor representing the dependence of impedance on pressure for the specific gas. The value of $m$ is close to one; its established value for particular inert gases can be found in tables of impedance dependence on pressure in current reference texts on inert gases for arc lamps. The impedance is critical in the sense that if it is too high, it would be commercially impractical to provide an impedance matching circuit capable of coupling in sufficient RF voltage to start or maintain the plasma, and the power losses in the coupling circuit would be impractically high, which increases the difficulty of coupling power in. If the characteristic length is too large, the lamp would be impractical for laser pumping because a major portion of the emitted light could not practically be directed into the laser rod and would be lost; also the intensity of light output per unit of lamp envelope surface area would be reduced. The pressure is critical in that if it is too low, the amount of light radiated is insufficient to provide the required intensity of light; if the pressure is too high, the plasma impedance increases, which increases the difficulty of coupling power in, and the plasma becomes opaque, i.e., it absorbs some of the energy initially radiated into the pumping bands it emits thereby reducing the output.

The value of the characteristic length, $\Lambda$, is determined by the particular configuration of the envelope and by the dimensions of that configuration. There are separate formulae for determining the characteristic lengths of envelopes of different geometric configurations, e.g., spheres, cylinders, annulae, and square sided configurations; the weights given the lateral dimensions, i.e., radii, width or height, and the weights given the lengths in these formulae vary in accordance with the particular configuration being considered. For example, the general definitions of the characteristic lengths of several representative lamp envelope configurations are as follows:

1. For a cylindrical envelope of length L and radius R, $$\frac{1}{\Lambda^2} = \left(\frac{\pi}{L}\right)^2 + \left(\frac{2.405}{R}\right)^2$$

2. For a spherical envelope of radius R, $$\frac{1}{\Lambda^2} = \left(\frac{\pi}{R}\right)^2$$

3. For an annular envelope of length L, outer radius $R_o$ and inner radius $R_i$, $$\frac{1}{\Lambda^2} \approx \left(\frac{\pi}{L}\right)^2 + \left(\frac{2.4}{R_o - R_i}\right)^2$$

The critical lamp envelope geometry for constructing lamps of this invention is geometry which will have a characteristic length within a particular range. As indicated by the formulae above, the one most significant dimension in determining the characteristic length of an envelope of any configuration is the width of the envelope between its closest walls, and figures for this width and for the length of the envelope (i.e., the largest dimension) will, if inserted in the characteristic length formula for the geometry involved (omitting values for any additional dimensions referred to) give a characteristic length value which is a sufficiently close approximation of the characteristic length to construct lamp envelopes having the requisite characteristics for providing lamps of this invention. Accordingly the critical dimensions of lamp envelopes for this invention are suitably the length and the "effective width" which as used herein is defined as the width of the envelope between its closest walls. For example, in a cylindrical or spherical envelope, the effective width is the diameter; in an annular envelope it is the width of the annulus (i.e., the difference between the inner and outer radii), in an elliptical envelope it is the shortest diameter, and in a square sided envelope it is the distance between the closest sides.

In accordance with the invention it has been found that an RF excited inert gas arc lamp which will produce sufficient intense light to pump a laser and in which impedance matching and sufficient input power are supplied by a fairly simple circuit and a single voltage source is provided by a lamp in which the pressure of the gas, in cold condition before a plasma is generated therein, is in the range of from about 0.5 to about 20 atmospheres and the effective width is in the range of from about 1 to about 30 mm., while its length is not more than about 150 mm.

The power supply circuit for practical operation of the lamp is adjustable to resonance and to match the impedance of plasma in the gas, and may be provided by one of a number of different circuits, for example, a single voltage source applied through a T network or a parallel resonant circuit, or multiple voltage sources, each with a different range of impedances, which may be alternatively applied for substantially matching successively the cold gas impedance and then the impedance of the plasma. For simplicity and economy it would be desirable to be able to utilize a single voltage source and in practice a single voltage source is effectively applied for start up and for maintaining a plasma by a $\pi$ circuit consisting of two variable capacitors respectively in series and in parallel between the RF voltage supply and the coil. In operation, a plasma is ignited in the gas by any suitable means. A simple method is to momentarily energize a Tesla coil whose probe is placed close to the exterior of the lamp envelope. Alternatively a supplementary high frequency, high voltage could be applied momentarily through the coil around the envelope. After a plasma is ignited in the gas, a stabilized high current, low voltage for maintaining the discharge is provided by matching the impedance of the power supply circuit to the impedance of the discharging plasma.

An RF excited inert gas arc lamp of this invention is adapted for pumping a laser by making the lamp envelope a size compatible with the size of the laser rod and mounting it adjacent to the laser rod for as much of the lamp output as possible to impinge on the rod. In operation the lamp generates a great deal of heat which might damage the laser rod, therefore the usual lamp and laser combination embodying the invention will ordinarily include means for cooling the rod, such as by mounting the lamp envelope and laser rod in a chamber through which water or other light transmissive coolant is circulated.

In order to have the maximum possible amount of light from the lamp directed into the laser rod, a reflector is placed to direct back toward the rod that portion of light from the lamp which does not fall directly on the rod and which would otherwise be lost. A particular feature of lamp and laser rod combinations of the present invention is that for some configurations it has been found that by using diffuse reflectors, rather than the customary specular reflectors, the amount of light from the lamp effectively coupling into the laser rod is very significantly increased.

In one embodiment of the invention the lamp envelope is an annular compartment having an axial bore through which the laser rod is mounted; the annular compartment is in the cooling chamber which has transparent walls and the coil is around the outside of the chamber. In this form a diffusing reflector may be wrapped around the chamber, inside or outside the coil. If the coil is inside the reflector, some of the diffused light is lost by being blocked or diverted by the turns of the coil; this loss is avoided dby an alternative arrangement in which the turns of the coil are flattened and their inward facing surfaces are given a diffusing reflecting finish, as by coating them with flat white finish. If the coil is outside the reflector, it does not interfere with the light, but requires a higher current through the coil to induce a given voltage in the plasma due to the increased radius and area of the coil.

In another embodiment the lamp envelope is a cylindrical rod; the cooling chamber, which has a reflecting surface, or the separate reflecting surface which may be inside or outside a cooling chamber, is tubular and elliptical in cross section and the lamp envelope and the laser rod are mounted in parallel relation axially along the foci of the ellipse.

In still another embodiment the lamp envelope, which is a cylindrical rod, and the laser rod are mounted in parallel relation inside a spherical reflecting surface which may be a separate reflector or a reflecting surface on a spherical cooling chamber. In this form the lamp and the laser rod are spaced slightly apart on opposite sides of a line through the center of the spherical reflecting surface.

The function of elliptical or spherical reflecting surfaces is to focus onto the rod either the stray light which does not impinge directly from the lamp onto the rod, or light which passes through the rod without being absorbed into it. Thus specular reflection is more efficient with these particular surface configurations.

Other suitable lamp configurations might also be devised, but the foregoing configurations, which are subsequently described in detail, appear at present to be the most practical.

Laser rods tend to contain impurities and it sometimes happens that some wavelengths of light from the pumping source are absorbed by the impurities in the laser rod and cut down the efficiency of the laser. To avoid this problem an appropriate filter may be placed around the rod or in position to filter the light reflected to the rod. In the latter case the light going directly to the rod from the lamp would not be filtered, but filtering only the reflected light, which is the major portion of the light received by the rod would normally reduce the unwanted component sufficiently to preserve the efficiency of the laser.

DESCRIPTION OF THE DRAWINGS

Further objects, advantages and features of an RF excited inert gas arc lamp adapted for pumping a laser in accordance with the present invention will be apparent from the following detailed description of illustrative embodiments that are shown in the accompanying drawings, in which:

FIG. 1 is a perspective view, partly schematic, of an RF excited gas arc lamp of this invention;

FIG. 2 is a cross sectional view, partly schematic, longitudinally through one embodiment of an arc lamp and laser rod combination in accordance with the invention;

FIG. 3 is a cross sectional, partial view similar to the right hand end portion of FIG. 2 illustrating another embodiment having a different placement of the coil and showing a modification in which a Tesla coil is mounted through a wall of the cooling chamber with its probe in contact with the envelope;

FIG. 4 is a cross sectional view, similar to FIG. 2 but showing an alternative form in which the reflector is provided by flattened turns of the coil;

FIG. 5 is a cross section view, partly schematic, laterally through another embodiment of an arc lamp and laser rod combination in accordance with the invention;

FIG. 6 is a view along the line 6—6 of FIG. 5;

FIG. 7 is a cross sectional view, partly schematic laterally through still another embodiment of arc lamp laser rod combination of this invention; and FIG. 8 is a view along the line 8—8 of FIG. 7.

DETAILED DESCRIPTION

As illustrated in FIG. 1, an RF excited gas arc lamp in accordance with this invention, such as a krypton arc lamp for pumping an Nd:YAG laser, comprises generally a transparent envelope 10, suitably of quartz, containing krypton, xenon or argon gas. The gas is excited by an RF (0.1 – 100 megacycles per second) voltage coupled into it by a coil 11 adjacent to the envelope so that the envelope is in the flux generated by an RF voltage through the coil. The coil 11 preferably surrounds the envelope, and is preferably wrapped closely around the envelope, but it could also be beside the envelope. In accordance with the criteria previously discussed, in order to provide an RF excited krypton, xenon or argon arc lamp which will produce light of sufficient intensity (watts per cm$^2$) to pump a laser, the effective width of the envelope is in a range of from about 1 to about 30 mm., the length is not more than about 50 mm. and the pressure of the gas, cold (i.e., ambient temperature before voltage is coupled into it) is in a range of from about 0.5 to about 20 atmospheres.

The lamp is powered by a source 12 of RF voltage connected to the coil and is adapted to supply sufficient RF power, e.g., 5 kilowatts at 30 megahertz, to maintain a plasma in the gas and to assist in the start up of the lamp. As previously mentioned, the impedance of the power supply circuit through the coil 11 should substantially match the impedance of the cold gas and then have its impedance adjusted to substantially match the impedance of a plasma in the gas. This is suitably provided by a $\pi$ network consisting of variable capacitors 13 and 14 connected respectively in parallel and in series in the circuit for adjusting the circuit to resonance when the operating voltage is applied to the coil at start up, before the plasma is ignited, and then, after the plasma is ignited, to adjust the impedance to match the impedance of the plasma.

For starting and operating the lamp, RF voltage from the source 12 is applied to the coil 11 and the circuit is adjusted to resonance by means of the variable capacitors 13 and 14. A plasma is then ignited in the gas by applying an additional high voltage or a high voltage spark to the gas. This may be done in various ways; for example by a second coil around the envelope connected to another source of high voltage, but, as illustrated, a particularly simple method is to apply a high voltage spark to the gas by placing the probe 15 of a Tesla coil 16 close to the envelope 10 and actuating the Tesla coil to produce a spark. When the plasma ignites, the voltage in the plasma drops and the current increases, the impedance of the coil circuit is then adjusted by the variable capacitors 13 and 14 to substantially match the impedance of the plasma for maintaining the plasma discharge. Though the impedance of the cold gas differs from the impedance of the plasma by more than six orders of magnitude, the impedance match is made rapidly enough by manually adjusting the capacitors to avoid letting the newly ignited plasma be extinguished due to insufficient power.

FIG. 2 shows a preferred configuration of a lamp and laser rod combination in accordance with the invention. As shown the lamp envelope 10a is an annular compartment, having an axial bore 17 through it, mounted in a chamber 18 which is defined by side walls 19 and end walls 20. A laser rod 21 is supported axially through the bore 17 by having its end portions, which are rod holders 22, mounted through the chamber end walls 20. The annular envelope 10a has an annular support portion 23 projecting from its left end and attached to the left end chamber wall 20 for supporting it in the chamber, and it has a thin hollow rod-like extension 24 from its right end extending out through the right end wall 20 of the chamber 18. The hollow interior of the extension 24 opens into the main portion of the envelope 10a and provides a portion of the envelope 10a easily accessible outside the chamber 18 to which a high voltage spark may conveniently be applied, as by a Tesla coil 16 for igniting a plasma in the gas as described above.

An inert gas arc, particularly a krypton arc, producing sufficient light to pump a laser, is extremely hot and could damage the laser rod 21. The rod is therefore preferably cooled, and this is suitably accomplished by circulating water from a source (not shown) through the interior of the chamber 18 from an inlet 25 in one side wall 19 to an outlet 26 in the opposite side wall 19, so as to circulate around all the exterior surfaces of the laser rod.

The gas in the envelope 10a is excited by means of a coil 11a wrapped around the outside of the chamber side walls 19 and connected into a power supply circuit which is the same as the circuit described with reference to FIG. 1.

The chamber 18 may be cylindrical or square, but in the embodiment shown in FIG. 2, the chamber is preferably cylindrical and is dimensioned for the cylinder side walls 19, and the coil 11a therearound, to be closely around the outer circumference of the annular envelope 10a.

In order to have all the light possible from an arc in the envelope 10a directed to the laser rod 21 in the FIG. 2 embodiment, the side walls 19 of the chamber 18 are made of clear glass, or other transparent material, and a diffusing reflector 27 is wrapped around them, outside the coil 11a. Alternatively the reflector may be provided by coating the exterior or interior surfaces of the side walls 19 with a flat (i.e., dull) white coating of a suitable material, such as zinc oxide. The end walls 20 and rod holders 22 are also coated with diffusing reflecting material so that all the interior surfaces of the chamber are reflective. It has been found that with the FIG. 2 configuration a significantly greater portion of the reflected light is effectively coupled into the laser rod 21 by diffusing the reflected light rather than having it reflected specularly.

As previously mentioned, laser rods may contain impurities which absorb some wavelengths of the pumping light and destroy the efficiency of the laser. To overcome this, at least a portion of unwanted wavelength components of the pumping light are filtered out. This may be accomplished by wrapping a suitable filter around the laser rod 21, or, in the FIG. 2 embodiment wherein the chamber side walls 19 are transparent and the reflector is provided by an outer reflector 27, by coating the exterior surfaces of the walls 19 with reflective material, or the filter may be provided by making the chamber side walls of filter glass. For example, Nd:YAG laser rods very often contain impurities which absorb ultraviolet light to the detriment of the efficiency of the laser; thus with a krypton arc lamp for pumping an Nd:YAG laser rod 21 the chamber side walls 19 would be made of ultraviolet filter glass.

Of course with the foregoing filter arrangement, the only portion of the light filtered is the light which passes through the filter glass side walls 19 to be reflected back to the laser rod 21 by the reflector 27, or by an exterior coating of reflective material; the light that passes directly to the rod 21 from the inside diameter of the annular envelope 10a is not filtered, but filtering only the reflected light removes a sufficient proportion of the potentially harmful wavelengths to preserve the efficiency of the laser rod 21. In some instances it might be desirable to filter out all wavelengths outside a particular pumping band. Other filtering techniques could also be used, such as a filtering dye in the cooling fluid.

In an operative krypton arc lamp having the configuration of the FIG. 2 embodiment for pumping an Nd:YAG laser rod 21, the volume of the interior of the annular envelope 10a was 15 mm. outer diameter, 9 mm. inner diameter by 20 mm. long. The krypton was at a pressure of 3 atmospheres. The coil 11a had five turns, the RF voltage source 12 was a 5 kilowatt, 30 megahertz generator, the transmission line had an impedance of 50 ohms, and the variable capacitors 13 and 14 were adjustable over a range of from 30 – 1,000 picofarads and 5 – 250 picofarads respectively. With this circuit the lamp impedance could be matched to the power supply for power levels of from 0 to 5 kilowatts. The discharge was readily ignited by a spark from a Tesla coil. The Nd:YAG laser rod 21 had a diameter of 3 mm. and was 50 mm. long. The laser threshold was below 0.5 kilowatts and at 2.0 kilowatts of input power, a multi-mode laser power of 11.0 watts was measured. Note that for determining the effective width of the lamp envelope 10a in accordance with the criteria discussed above, the critical lateral dimension is the outer radius less than the inner radius. Thus in the foregoing example the effective width is 3mm., which is the 15 mm. outer diameter less the 9 mm. inner diameter divided by 2.

The number of turns of the coil 11a is not critical; the voltage in the plasma is, of course, inversely related to the number of turns in the coil; however, the more turns there are the less is the current necessary to create a given voltage in the plasma. Therefore in selecting the number of turns for the coil 11a, there is a trade off between the current losses when the plasma is ignited and the optical losses caused by light striking the turns of the coil. In practice it is believed that a suitable trade off is provided by a coil 11a having two to eight turns, the dimensions and values of the components being in the same general proportions as indicated by the foregoing example.

FIG. 3 shows another embodiment of a lamp and laser rod combination having a configuration generally similar to the FIG. 2 embodiment, but in the construction the coil 11b is outside the reflector surface 27a, which is shown around the outer surface of the chamber side wall 19. The reflector surface 27a may be a separate element or a coating on the outside or inside surfaces of the chamber walls. In this embodiment, as in the FIG. 1 embodiment, the reflecting surfaces are best made to diffuse reflect the incident light and all other interior surfaces on which stray light from the lamp impinges, such as the end walls 20 and the portions of the rod holders 22 inside the chamber 18, should be made reflective as by coating them with diffusing reflecting material.

With the coil 11b outside the reflecting surface 27a the turns of the coil do not block light, as in the FIG. 2 embodiment, however, having the reflecting surface interposed between the coil and the lamp means that the coil is a slightly larger diameter which means that a greater current must flow through the coil in order to induce a given voltage in the plasma. The power supply circuit is suitably similar to the circuit for the embodiments of FIGS. 1 and 2 but with the coil 11b outside the reflector 27a the coil is made of a larger number of turns (e.g., 10 to 20) of heavier wire, the number of turns being set by breakdown across the coil or across the capacitor 14.

The embodiment illustrated in FIG. 3 also shows an alternative arrangement for applying a spark to the envelope 10b for start up. Envelope 10a does not have an extension 24 outside the chamber 18 as in the FIG. 2 structure; instead a Tesla coil 16a is mounted through one chamber end wall 20 with its probe 15a adjacent the body of the envelope 10b.

FIG. 4 shows an embodiment generally similar to the FIG. 2 embodiment but with a modified reflector arrangement. In this instance, diffuse reflection of outwardly directed light from the lamp envelope 10a back into the laser rod 21 is provided by flattening the turns 29 of the coil 11c and coating the inwardly facing flattened surfaces with diffusing reflecting material as indicated at 27b. Adjacent turns 29 of the coil 11c are placed as close to each other as possible to minimize the loss of light between them and any spaces between are filled with diffuse reflecting material.

FIGS. 5 and 6 illustrate a different embodiment of the invention wherein the gas-containing quartz envelope 10c is cylindrical with a coil 11d around it. The RF power supply circuit to coil 11d is the same as described with reference to the previous embodiments. The lamp envelope 10c and the laser rod 21a are within a tubular reflecting surface 27c which is elliptical in cross section, and the lamp envelope 10c and laser rod 21a are mounted in parallel relation axially along the foci of the ellipse, respectively, so that light from the lamp envelope which does not pass directly into the laser rod is deflected back toward it. In this embodiment illustrated the elliptical configuration of the reflecting surface 27c is adapted to focus reflected light onto the laser rod 21a and is therefore preferably made to provide specular reflection, and the reflecting surface is suitably formed by a reflective coating on a transparent side wall 30 which, with end walls 31, define a cooling chamber 18a. The chamber 18a is elliptical in cross section, since its side wall 30 defines the configuration of the reflecting surface 27c, and is adapted to be cooled by circulating water through it from an inlet 25a to an outlet 26a (FIG. 6).

It will be appreciated that the reflecting surface 27c could be an independent element within the cooling chamber 18a, in which case the chamber could be any convenient configuration, such as rectangular or cylindrical.

Referring to FIG. 6, the laser rod 21a is supported in the chamber 18a by having its rod holders 22a mounted through the chamber end walls 31; the lamp envelope 10c is supported by a projection 33 from one end attached to one of the chamber end walls 31, and a rod-like extension 24a from its other end supported by, and projecting out through, the opposite end wall 31. The rod-like extension 24a, like the envelope extension 24 in the FIG. 2 embodiment, is hollow and opens into the body of the envelope 10c to provide a convenient envelope surface to which to apply a high voltage spark for igniting a plasma in the envelope, as by placing the probe 15 of a Tesla coil 16 close to the surface of the extension 24a.

In the embodiment as illustrated in FIGS. 5 and 6, a filter for filtering out unwanted wavelengths is shown as a filter element 34 around the laser rod 15. Alternatively the filtering could be provided by making the wall 30 of the chamber 18a of suitable filter glass.

FIGS. 7 and 8 illustrate an embodiment in which a cylindrical lamp envelope 10d and a laser rod 21b are mounted in parallel relation within a spherical reflecting surface 27d which is suitably a reflective coating on a quartz spherical wall 35 defining a spherical chamber 18b. Since the spherical reflecting surface 27d is intended to focus reflected light to the laser rod 21b at the center of the sphere, it is preferably a specular reflecting surface. The spherical wall 35 may be filter glass, the reflecting surface 27d being coated on the outside.

The envelope 10d has a coil 11e wrapped around it to which RF power for operating the lamp is applied from a power supply circuit that, as shown, is suitably the same as the power supply circuit illustrated in the previous embodiments. The envelope 10d and the laser rod 21b are mounted close together at the center of the spherical chamber and are supported therein on legs 36 and 37 extending respectively from the envelope and from the rod holders 22b of the laser rod to portions of the spherical wall 35.

The spherical chamber 18b will usually be a cooling chamber in which the laser rod 21b is suitably cooled by circulating a liquid coolant through the chamber from an inlet 25b to an outlet 26b.

For igniting a plasma in the lamp envelope 10d, the envelope may be provided with a rod-like extension 24b projecting out through the spherical wall 35 to provide an easily accessible surface of the envelope to which a high voltage spark is applied, as by a Tesla coil in the manner described with respect to previous embodiments.

What is claimed is:

1. An inert gas electrodeless arc lamp adapted to produce sufficient light of appropriate wavelength to pump a laser, comprising:
   a transparent lamp envelope containing an inert gas from the group consisting of krypton, xenon and argon, the effective width of the lamp envelope being in the range of from about 1 to about 30 mm; the length of the envelope being not more than about 150 mm, and the cold pressure of the gas therein being in the range of from about 0.5 to about 20 atmospheres;
   a coil around the envelope for the envelope to be in the flux generated by connecting RF voltage through the coil;
   a source of RF voltage connected in a circuit through the coil, said source being adapted to supply sufficient RF power through the coil to maintain a plasma in the gas in the envelope;
   means in said circuit for adjusting the impedance of the circuit first to match the impedance of the cold gas in the envelope and then to match the impedance of a plasma ignited in the gas; and
   means for mounting a laser rod adjacent the lamp envelope for light from the envelope to impinge on a laser rod mounted by said means.

2. The lamp of claim 1 in which said envelope is an annular compartment having a central bore therethrough and means for mounting a laser rod through said bore.

3. The lamp combination of claim 1 in which the gas in the lamp envelope is krypton and in which the difference between the outer and inner radii of the annular compartment is in the range of from 1 to about 30 mm. the annular envelope is not more than about 50 mm. long, and the cold pressure of the gas in the envelope is in the range of from 0.5 to about 20 atmospheres.

4. The lamp of claim 2 which includes diffuse reflecting means at the periphery of said annular compartment for reflecting back toward the central bore portion of the compartment that light from a laser rod mounted through said bore which reaches said outer periphery.

5. The lamp of claim 4 in which said reflecting means comprises diffuse reflecting surfaces around the outside of said annular envelope compartment, and circumferentially outside of the coil.

6. The lamp of claim 4 in which the coil is tightly around the outside surface of the lamp envelope annulus and said reflecting means includes a diffuse reflector outside the coil.

7. The lamp of claim 4 in which said reflecting means includes the turns of the coil being substantially flat in the direction toward the bore of the annulus, the flat surfaces facing said bore having diffusing reflective surfaces.

8. The lamp of claim 4 including filter means mounted for filtering out at least a portion of an unwanted component of the light received by the laser rod.

9. The lamp of claim 4 in which the lamp envelope annulus is axially within a cylindrical chamber, and which includes means for circulating a liquid coolant through the chamber, said coil being around the outside of the chamber.

10. The lamp of claim 9 in which the cylindrical side wall of the chamber is filter glass, and in which the diffuse reflecting surface is around the outside of said cylindrical side wall of the chamber.

11. The lamp of claim 1 including means for igniting a plasma in the gas, and variable impedance means in said circuit for adjusting the circuit substantially to resonance for obtaining a high voltage in the circuit before a plasma is ignited therein and then to substantially match the impedance of plasma in the gas.

12. The lamp of claim 11 in which said impedance adjusting means comprises a pair of capacitors, are in parallel and the other in series with the voltage source and coil.

13. An inert gas electrodeless arc lamp and a laser rod pumped thereby comprising in combination:
   a transparent lamp envelope containing an inert gas from the group consisting of krypton, xenon and argon, the effective width of the lamp envelope being in the range of from about 1 to about 30 mm; the length of the envelope being not more than about 50 mm, and the cold pressure of the gas therein being in the range of from about 0.5 to about 20 atmospheres;
   a coil around the envelope for the envelope to be in the flux generated by connecting RF voltage through the coil;
   a source of RF voltage connected in a circuit through the coil, said source being adapted to supply sufficient RF power through the coil to maintain a plasma in the gas in the envelope;
   means in said circuit for adjusting the impedance of the circuit first to match the impedance of the cold gas in the envelope and then to match the impedance of a plasma ignited in the gas;
   a laser rod mounted adjacent the lamp envelope for light from the envelope to impinge thereon; and
   reflecting means surrounding the lamp envelope and laser rod for reflecting toward the rod light from the lamp envelope which does not impinge directly on the laser rod and that light from the lamp envelope which is not absorbed by the laser rod.

14. The combination of claim 13 in which said reflecting means is a generally tubular surface that is elliptical in cross section, in which the lamp envelope is mounted at one of the foci of the elliptical surface, and which includes means for mounting a laser rod axially along the other of said foci.

15. The combination of claim 13 in which said reflecting means is a spherical reflecting surface enclosing the lamp envelope and laser rod being closely adjacent the center of the sphere.

16. The combination of claim 13 in which the gas in the envelope is principally krypton and the laser rod is an Nd:YAG laser rod.

* * * * *